No. 776,884.  
Patented December 6, 1904.

UNITED STATES PATENT OFFICE.

AUGUSTUS BISCHLER, OF BASLE, SWITZERLAND, ASSIGNOR TO THE FIRM OF BASLE CHEMICAL WORKS, OF BASLE, SWITZERLAND.

PROCESS OF MAKING INDOXYL, &c.

SPECIFICATION forming part of Letters Patent No. 776,884, dated December 6, 1904.

Application filed October 5, 1904. Serial No. 227,308. (No specimens.)

*To all whom it may concern:*

Be it known that I, AUGUSTUS BISCHLER, doctor of philosophy and chemist, a subject of the Emperor of Russia, and a resident of Basle, Switzerland, have invented new and useful Improvements in the Manufacture of Indoxyl, its Homologues, and their Derivatives, of which the following is a clear and complete specification.

The improvements relate to the process for manufacture of indoxyl, its homologues, and their derivatives by melting phenylglycin salts with alkalies in the presence of alkali metals.

By these improvements excellent yields of indoxyl, its homologues, and their derivatives are obtained by adding to the mixtures of phenylglycin, its homologues, or their derivatives with alkalies and alkali metals or by passing through the mixtures in the form of gas or vapor a substance which has the property of forming with the alkali metal a compound capable of eliminating or separating water from the mass. Among such substances are, for instance, acetylene, ammonia, or substituted ammonia, such as anilin, diphenylamin, or the like.

The process consists in heating for some time until the greater part of the alkali metal has reacted the mixture of phenylglycin salt with the alkali and alkali metal to the temperature necessary for the formation of indoxyl, then adding the substance or substances of the kind in question and continuing to heat.

For example, to a mixture of seventy parts of well-dried caustic alkali and nineteen parts of potassium salt of phenylglycin heated to about 250° centigrade twelve parts of potassium or seven parts of sodium may be added and the heat continued for some time while stirring. Then five parts of anilin may be introduced through a reflux cooler and the mixture retained at the same temperature until the formation of indoxyl ceases to increase. The mass is worked up to indigo in the usual manner.

Good yields of indoxyl are also obtained if in the above example instead of adding anilin ammonia or acetylene is passed through the mixture.

For the phenylglycin or its salts may be substituted other arylglycins or derivatives of arylglycins or their salts, whereby the corresponding indoxyl derivatives are formed. Thus, for example, from the arylglycin anilids the arylglycin-arylglycids, also from the alpha-arylhydantoïnes, the corresponding indigo-leuco derivatives may be obtained in very good yields, according to the above process.

What I claim is—

1. The process for the manufacture of indoxyl, its homologues and their derivatives, by heating the alkali salts of the arylglycins or of their derivatives with an alkali and an alkali metal to the temperature necessary for the formation of indoxyl, until the greater portion of alkali metal has reacted, then reacting on the mixture with a substance having the property of forming with the alkali metal a compound capable of eliminating or separating strongly water from the mass, and afterward continuing to heat until the formation of the indigo-leuco bodies is completed.

2. The process for the manufacture of indoxyl, its homologues and their derivatives, by heating the alkali salts of the arylglycins or of their derivatives, with an alkali and an alkali metal, to the temperature necessary for the formation of indoxyl, until the greater portion of alkali metal has reacted, then introducing anilin in the mixture and continuing to heat until the formation of the indigo-leuco bodies is completed.

In witness whereof I have hereunto signed my name, this 23d day of September, 1904, in the presence of two subscribing witnesses.

AUGUSTUS BISCHLER.

Witnesses:
  GEO. GIFFORD,
  AMAND RITTER.